Sept. 2, 1969    M. C. K. DE PORAY    3,464,133
DISPLAY APPARATUS

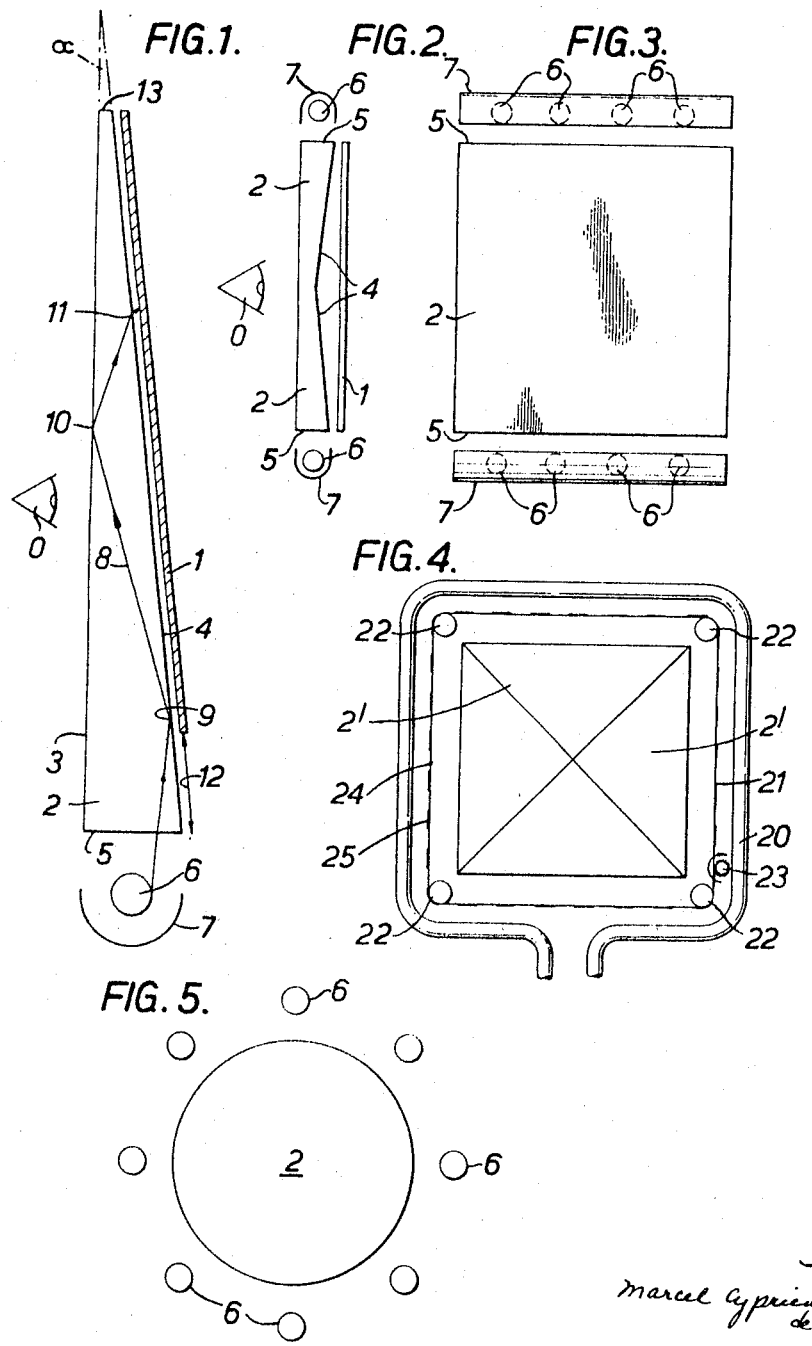

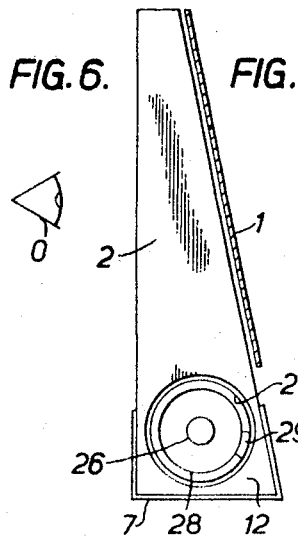
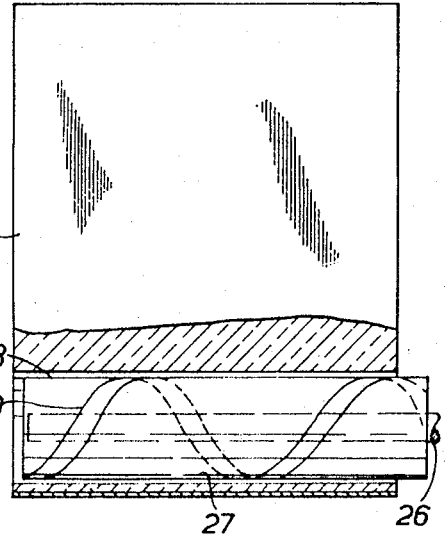
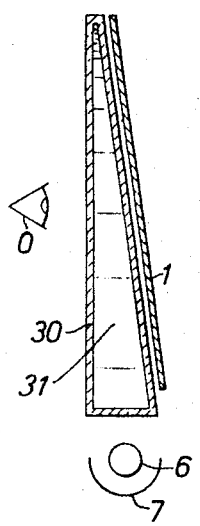
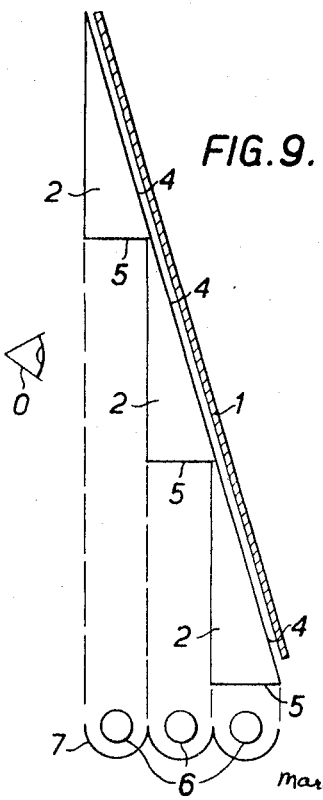

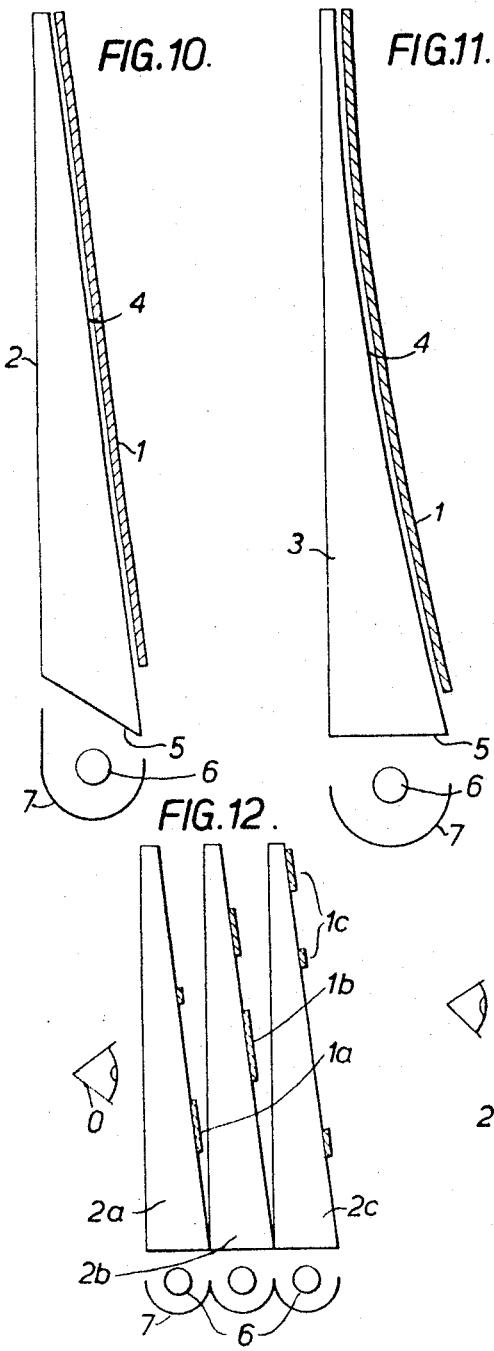

Filed Oct. 20, 1965    6 Sheets-Sheet 4

Inventor
Marcel Cyprien Kuczynski
de Poray

Watson, Cole, Grindle + Watson
Attorneys

Sept. 2, 1969  M. C. K. DE PORAY  3,464,133
DISPLAY APPARATUS
Filed Oct. 20, 1965  6 Sheets-Sheet 5
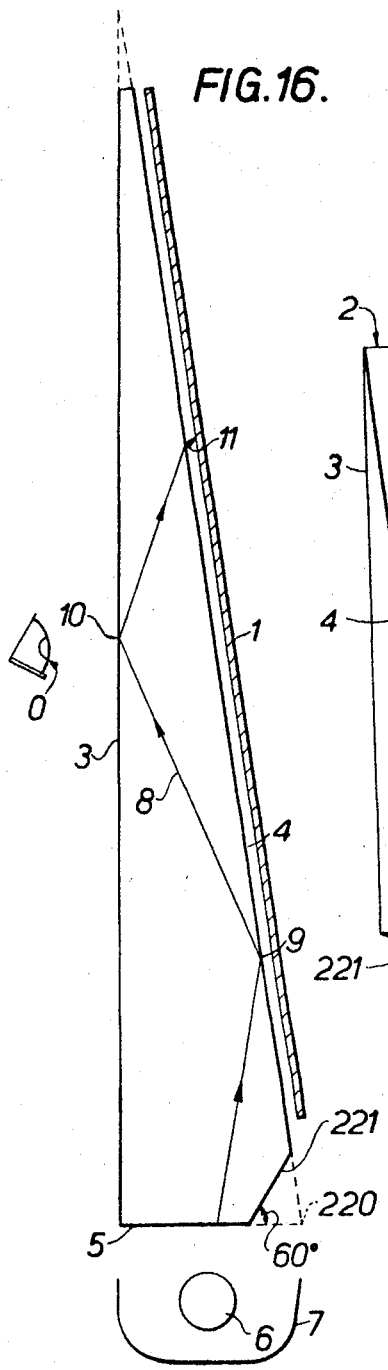
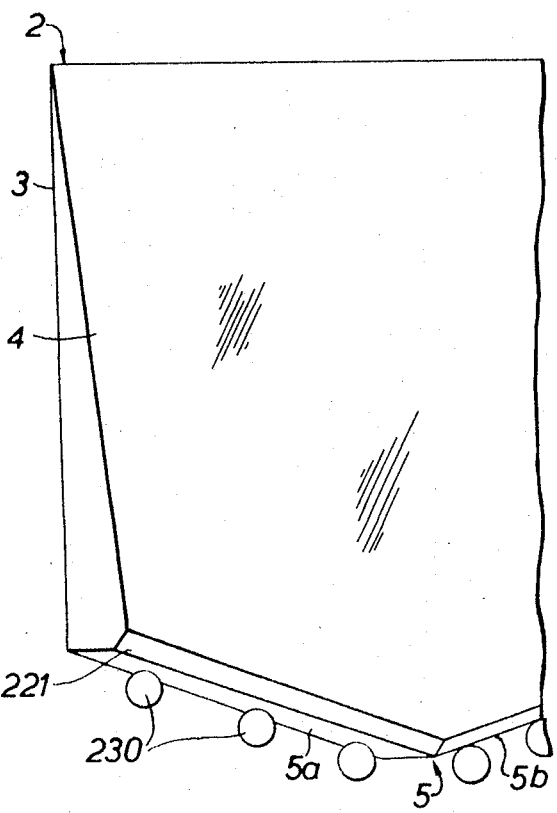

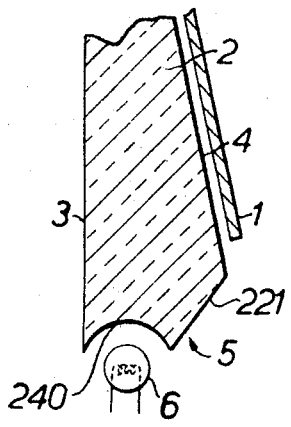
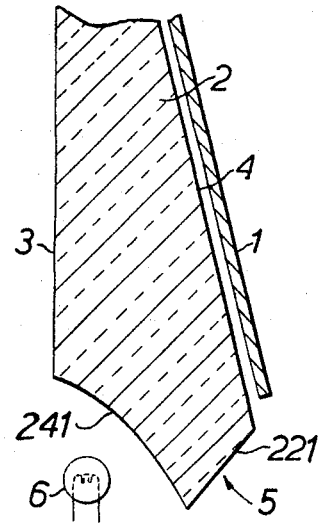
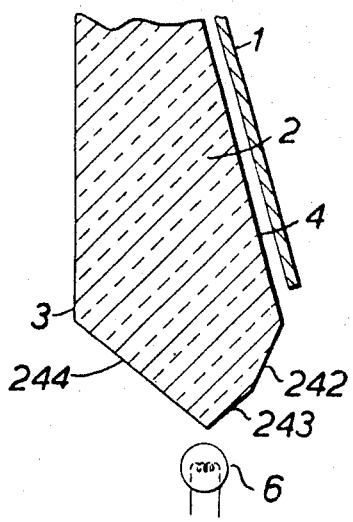
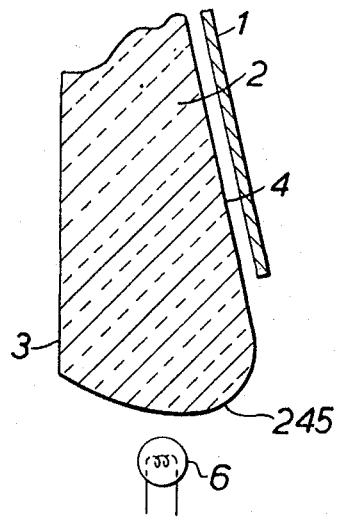

United States Patent Office 3,464,133
Patented Sept. 2, 1969

3,464,133
DISPLAY APPARATUS
Marcel C. K. De Poray, 74 Rue de St. Lazare,
Paris 9, France
Filed Oct. 20, 1965, Ser. No. 502,773
Claims priority, application Great Britain, Apr. 30, 1965,
18,392/65
Int. Cl. G09f *13/30*
U.S. Cl. 40—130                                22 Claims

ABSTRACT OF THE DISCLOSURE

This invention is directed to an apparatus for display purposes which includes a reflecting surface with a multiplicity of facets arranged in predetermined different orientations with a source for illumination of the facets so that an observer looking at the surface sees an effect of animation.

This invention relates to display apparatus comprising a light reflecting surface and means to illuminate it. More especially the invention is concerned with display apparatus of the kind comprising a reflecting surface with a multiplicity of facets arranged in predetermined different orientations and means for illuminating the facets in predetermined variable manner so that an observer looking at said surface sees an effect of animation, or other desired effect: such apparatus will herein be called "animation display apparatus." Various forms of animation display apparatus are described in French Patent No. 992,254 (Latrobe).

The main object of the invention is to provide a simple and compact form of display apparatus.

With this object in view, the invention provides animation display apparatus wherein the reflecting surface is positioned immediately behind (from the observer's point of view) a slab of transparent material having non-parallel faces, the illuminating means being arranged to direct light into the thick edge of the slab.

The thick edge of the slab may be shaped in cross-section perpendicular to the faces so as to achieve a desired illumination of the reflecting surface. Thus it will commonly be desired to have a substantially uniform illumination over the whole or nearly the whole area of the rear face of the slab, such as cannot be obtained with a simple slab the section of which is a truncated right-angled triangle of small apical angle. This shaping of the thick edge may comprise bevelling where in a simple slab as just mentioned the plane of the thick edge meets that of one face. Thus for example a single or double plane bevel joining the thick edge and the rear face improves the uniformity of illumination over the rear face, though other shapings are possible. This aspect of the invention will be discussed further below.

The invention includes certain further, but optional features and will be further described with reference to various embodiments illustrated by way of example only in the accompanying somewhat diagrammatic drawings:

FIGURE 1 is a sectional view of a first form of animation display apparatus;

FIGURES 2 and 3 are respectively a sectional view and a frontal view of a second form of animation display apparatus;

FIGURES 4 and 5 are frontal views of two further embodiments of the invention;

FIGURES 6 and 7 are respectively two sectional views, taken at right angles and illustrating a further embodiment of the invention;

FIGURES 8 to 15 are sectional views showing further forms of animation display apparatus according to the invention;

FIGURE 16 is a sectional view of yet another form of animation display apparatus according to the invention, with the thick edge of the transparent slab bevelled;

FIGURE 17 is a partial perspective view of an animation display apparatus according to the invention and having a slab with a bevelled thick edge, the view being from the rear with parts removed, and FIGURES 18 to 21 show in transverse section positions of further embodiments of the invention having different forms of bevelling along the thick edge of the slab.

Figure 14:
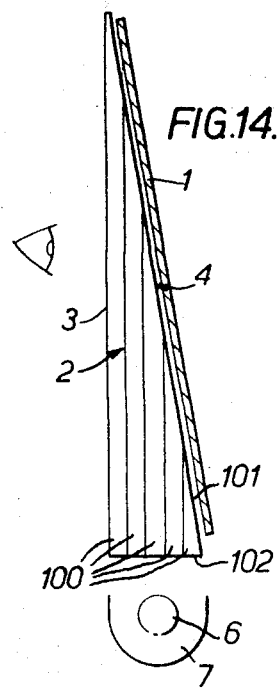

A typical embodiment of the invention is shown in FIGURE 1. A faceted surface 1 is disposed behind (from the point of view of an observer O) a rectangular slab 2 of glass or of the transparent acrylic plastics material, "Perspex," the slab having plane front and rear faces 3, 4 at a small angle α. Illumination means are arranged along the thick edge 5 of the slab 2 and may take the form of a plurality (usually six) of electric lamps 6 disposed in a line within a reflecting shield 7 and illuminated in predetermined sequence by some sort of commutator device: however other illumination means may be used, such as discussed below. The path of a typical ray from a lamp 6 is shown at 8. The ray enters the slab 2 and is totally internally reflected at 9 where it meets the rear face 4 of the slab. The ray then returns to the front face 3 of the slab, which it meets at 10 at a smaller angle of incidence (angle between ray and the normal to the surface) due to the slab faces being non-parallel: however the angle is still above the critical angle, so the ray is again totally internally reflected. The ray returns to the rear face 4 which it meets at 11 with a still smaller angle of incidence, this time below the critical angle, so that the light (or most of it) escapes, is reflected by the facets on the surface 1, travels through the slab at small angles of incidence, and reaches the observer O. A portion of the slab near the thick edge 5, which portion is shown at 12, may not pass out enough light, and it may be desirable not to have the faceted surface over this portion. The thin edge 13 of the slab 2 may be silvered.

Though it will commonly be convenient for the slab to have a simple rectangular shape with the illumination means over one edge only, as shown in FIGURE 1, a double slab arrangement may be preferred for larger displays. Such an arrangement is shown in FIGURES 2 and 3, and consists essentially of two slabs 2 as shown in FIGURE 1 with their thin edges 13 joined, illumination means such as lamps 6 over both thick edges 5, and the faceted surface extending over the rear faces 4 of both slabs: the illumination means must of course by synchronized. Other combinations of slabs are possible; for example in FIGURE 4 four similar slabs 2' are shown, each in the form of a 45°-90°-45° triangle, fitted together to make up a square, the long edge of each slab being the thick edge and provided with illumination means for example the means illustrated and to be described below. A hexagonal or other polygonal shape could be similarly built up. FIGURE 5 shows a circular slab, having a plane front face and a rear face in the shape of a cone of large vertical angle. Illumination means are arranged all around the periphery of the slab, which is thicker than the center, and may take the form shown, comprising stationary lamps 6 illuminated in sequence.

The illumination means can take various forms. Stationary lamps illuminated in sequence, as shown in FIGURES 1, 3 and 5 provide one convenient form of illumination means. A second main form of such means comprises a lamp or lamps which are permanently illuminated, but periodically obscured. FIGURE 4 shows one example of this, where, surrounding the slabs 2' is a fluorescent tube 20 permanently illuminated and an endless masking band 21 trained over rollers 22 at the corners of the square and driven continuously by wheel 23 connected to an electric motor (not shown). The masking band 21 has alternate translucent and opaque portions 24, 25: it may be similar to cinematograph film, the wheel 23 being a sprocket. A light shield (not shown) surrounds the tube 20 and band 21 and driving means therefor. This arrangement can be adapted for illuminating a single edge 5 as shown in FIGURE 1 by having a fluorescent tube extend along the edge and the masking band running between a driven sprocket at one end of the tube and an idle sprocket at the other, one run of the band being interposed between the tube and the edge of the slab. FIGURES 6 and 7 show a display device with another form of illumination means employing a permanently illuminated periodically obscured lamp. Apart from the illumination means the device in principle resembles that of FIGURE 1: similar parts will be designated by the same reference numerals and will need no further description. The lamp in this embodiment is a fluorescent tube 26 extending axially through a cylindrical hole 27 formed in the thick edge portion 12 of the slab 2. A masking cylinder 28 surrounds the tube 26 and is mounted for rotation by an electric motor, not shown. The cylinder 28 is transparent but has a helical opaque portion 29. Alternatively the cylinder 28 could be replaced by a helical band of opaque material. The light shield 7 in this embodiment surrounds the thick edge portion 12 of the slab. A third main form of illumination means comprises permanently illuminated lamps which are continuously moved, e.g. a group of lamps, say four, mounted on a frame and rotated so as to pass the thick edge of the slab and transmit light into it. This form of illumination is well adapted for example to the form of slab illustrated in FIGURE 5.

Especially for very large displays a homogeneous slab of glass, "Perspex" or like material such as illustrated in the figures so far discussed may be replaced, as shown in FIGURE 8, by a non-homogeneous slab in the form of a shell or envelope 30 of glass or "Perspex" which contains a liquid, e.g. water. In other respects the FIGURE 8 embodiment is similar to that of FIGURE 1, and similar parts will be designated by the same reference numerals and will need no further description.

FIGURE 9 illustrates another embodiment of the invention designed principally for larger displays. Here, a single faceted surface 1 lies behind the rear faces 4 of three slabs 2 disposed in echelon. Each slab 2 is provided with separate illumination means in the form of a row of lamps 6 illuminated in sequence, with the lamps of the different rows synchronized: however, other illumination means may be used, as above explained. Each slab 2, with the corresponding portion of faceted surface 1 and illumination means forms a display apparatus as shown in FIGURE 1, and will need no further description. The provision of three small slabs 2 instead of one large one economizes in material, and reduces light losses.

The FIGURE 9 arrangement, in addition to the advantages mentioned, has the valuable property of to some extent evening out the light distribution over the faceted surface 1. The simple arrangement of FIGURE 1 tends to provide better illumination to the faceted surface near the thin edge of the slab than near the thick edge; this may not always be objectionable, but will sometimes be so, and FIGURE 9 shows one way of dealing with the problem. Another way of improving the illumination of the faceted surface is to angle the thick edge 5 towards the faceted surface 1 as shown in FIGURE 10, so that this edge makes an angle greater than 90° with the front face 3 of the slab. Alternatively, or in addition the rear face 4 of the slab may be curved, as shown in FIGURE 11.

Returning now to FIGURE 1, it will be appreciated that although certain rays such as that indicated will be totally internally reflected as at 10, at the front face 3 of the slab 2, other rays will pass out of the front face in an obliquely upward direction and will be lost. Thus, in the simple arrangement of FIGURE 1 something like half the light from the lamps 6 will be wasted. To reduce this loss, the front face 3 only of the slab may be fitted with a layer of some transparent substance having a different critical angle to that of the material of the slab.

According to the invention and as illustrated in FIGURE 12, a plurality of slabs 2a, 2b, 2c, may be disposed one behind the other sandwiching portions 1a, 1b, 1c, of faceted reflecting surface, the slabs being provided with synchronized illumination means here shown as lamps 6 illuminated in sequence: by this means a three-dimensional effect can be produced. The arrangement of FIGURE 12 is equivalent to three devices such as shown in FIGURE 1, one behind the other, the portions 1a, 1b, 1c, together making up an uninterrupted area. A similar effect with some saving of space can be had with the arrangement of FIGURE 13, where the middle slab 2b is inverted.

A further embodiment of the invention is illustrated in FIGURE 14. Here the slab, designated generally 2, is made up of a series of relatively thin (for example ⅛" thick) parallel-faced sheets 100 of transparent material which are clamped together but not optically joined. The front face 3 of the composite slab is formed by the plane front face of the first sheet 100. The sheets 100 are out at an angle to form a plane rear face 4 inclined to the front face and composed of inclined surfaces 101 of all the sheets. Other parts of the apparatus are as shown in FIGURE 1. Light entering, say, the edge 102 of the rearmost sheet 100, at the thick edge 5 of the composite slab 2, is reflected back and forth between the surface 101 and the front surface of that sheet until it emerges towards the reflecting surface 1: this light is then reflected back through all the sheets to the observer. Similarly the light entering the edge 102 of the next rearmost sheet 100 is reflected between the parallel faces thereof until it reaches the part of the sheet having the inclined rear surface 101, where in due course it emerges to the reflecting surface 1. The arrangement is distinguished from that of FIGURE 1 in that light travels only within the individual sheets 100 and not back and forth between front and rear faces 3, 4 of the composite slab, thus improving the distribution of light to the reflecting surface 1: the effect is similar to though not identical with that of the FIGURE 9 arrangement.

Figure 15:
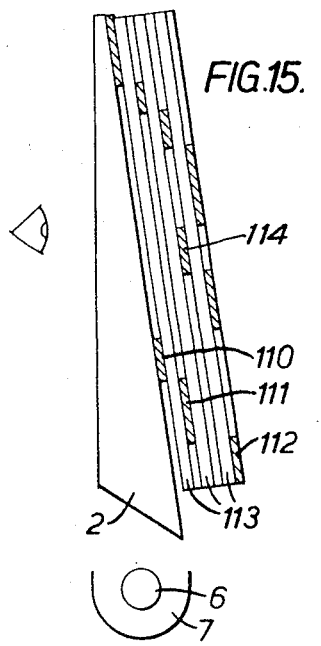

FIGURE 15 illustrates another method of achieving a three-dimensional effect. A slab 2 is arranged as illustrated in FIGURE 1 except that the thick edge is inclined. The reflecting surface 1 is divided into a series of parts 110, 111, 112 and 114 disposed between parallel faced sheets 113, the whole being clamped to the rear face 4 of the slab 2.

Another method of achieving a three-dimensional effect makes use of the disclosures of British patent specification 939,022. The front face 3 of the slab 2 in FIGURE 1 (or the corresponding face in other embodiments of the invention above described) is given a lenticular configuration, equivalent to a series of parallel part-cylindrical lenses: the face of the slab is formed so, or a separate sheet with one plain and one lenticular surface may be superimposed on that face. Areas of the surface 1 which do not require to exhibit an effect of animation are given the special printing described in the specification referred to, while areas where animation is required are provided with the facets previously described. In this way a static three-dimensional picture may be obtained with a superimposed animation effect: for example as "animated" waterfall may appear to cascade over static, but three-dimensional, rocks.

It is to be appreciated that the embodiments illustrated are only some examples of apparatus according to the invention and that features of some embodiments can readily be transferred to others.

In all cases it suffices simply to support the faceted reflecting surface adjacent the rear surface of the slab and there is no need to join this surface optically to the slab; this surface can readily be changed for another by unskilled persons.

Reverting to the simple form of display apparatus illustrated in FIGURE 1, it has been found with a slab of simple triangular or truncated triangular or similar section, that the illumination of the reflecting surface varies over the height of the slab and that (as above mentioned) no illumination can be obtained adjacent the thick edge of the slab; thus the area of the slab must be greater than the area of the reflecting surface. The amount of the area of the slab which cannot be used depends on the apical angle of the triangle, but is always appreciable, say 20% to 30% of the total.

I have found that by controlling the way in which the light beams start their path in the slab, the illumination at the rear face of the slab can be varied. Thus the thick edge of the slab may be shaped, in cross-section perpendicular to the faces, so as to obtain substantially uniform illumination over the whole or nearly the whole area of the rear face of the slab: however in special circumstances it may be desired to have the illumination vary in some predetermined manner over the area of the rear surface.

In one embodiment of the invention, the slab is bevelled in the region where the planes of a face and thick edge meet.

In one preferred arrangement according to the invention, the bevel removes one quarter of the width of the thick edge, and makes 60° with the plane thereof. Some benefit will be obtained even if the bevel is considerably smaller. A larger bevel will reduce the amount of light going into the thick edge of the slab, and though a bevel larger than one quarter is possible, excessive enlargement is disadvantageous; 60° is regarded as the maximum bevel angle for the best results a 2° apical angle is preferred. However the invention contemplates other ways of shaping the thick edge: thus it could be faceted, each facet being plane, or convex or concave. The single bevel referred to could be replaced by two or more adjacent bevelled surfaces, and the part of the thick edge forward of the bevel could be concave or angled up to meet the front edge obliquely. Some examples of how the thick edge can be shaped will be described later.

The light rays through the bevelled surface reach a face of the slab lower in the slab than the rays through the rest of the thick edge.

Referring once again to the drawings, the construction of FIGURE 16 is generally similar to that of FIGURE 1 except that, in the region where the planes of the rear face and thick edge 5 meet, at the line 220, the slab is bevelled: the bevelled surface 221 accounts for one quarter of the width of the thick edge and makes an angle of 60 therewith. The effect of the bevel is to allow light to pass out to the reflecting surface almost immediately above the intersection of the bevelled surface of the rear face of the slab. Without the bevel some 20% of the rear face going from the thick edge would not transmit out any light at all.

In a practical construction, the slab might have overall dimensions of 12″ x 12″, with a thick edge of ⅜″, the bevel accounting for ⅛″ of this edge. The angle α is preferably about 2° and does not exceed 6°.

FIGURE 17 shows an animation display device the cross-section of which is similar to that of FIGURE 16. Similar parts are once again designated by the same reference numerals and will not require further description. However, as seen in FIGURE 17, the thick edge 5 is formed in two parts 5a and 5b inclined to one another, and the illumination means takes the form of six electric lamps 230 disposed three opposite one part 5a and three opposite the other part 5b of the thick edge of the slab 2:

the lamps are illuminated in predetermined sequence by some sort of commutator device. The reflecting surface 1 is formed with a multiplicity of facets arranged in predetermined different orientations and under the cyclically varying illumination from the lamps 230 the observer sees an effect of animation. Each part 5a, 5b of the thick edge is separately bevelled, as will be seen from the drawings in the same manner as shown in FIGURE 16; the effect of the bevel is once again to allow light to emerge adjacent the thick edge, rather than only at some distance from it. The arrangement of the thick edge in two parts at an angle allows the light from the lamps to be directed generally towards the middle of the slab, which has been found to improve the effective illumination of the reflecting surface.

In a practical construction the slab might once again be 12″ x 12″ approximately, with the thick edge projecting by 1″. (For purposes of illustration the angle of the thick edge part is exaggerated. Once again with these dimensions the thick edge may be ⅜ wide, the bevel being made at 60° and taking up ⅛ of the thick edge.

FIGURES 18 to 21 show various forms of the apparatus described and illustrate different ways of shaping the thick edge of the slab. In these figures for parts similar to those of FIGURE 1 the same references are used, and no further description will be needed.

FIGURE 18 illustrates thick edge 5 having a bevel 221 like that of FIGURE 16; however the part 240 of the thick edge forward of the bevel is concave and the lamps 6 project slightly into it.

FIGURE 19 once again shows a thick edge 5 having a bevel 221: the part 41 of the edge 5 forward of the bevel is slightly concave and angled up to meet the front face 3 of the slab at an oblique angle. The lamps 6 are placed forward of the line of intersection of the bevel 221 and concave forward part 41.

FIGURE 20 shows a thick edge having a bevel in two planes 242, 243, and an angled up forward part 244. The lamps 6 are centrally placed.

FIGURE 21 shows a slab where the thick edge is convex as shown at 245 and rounded into the rear face 4 of the slab.

It will be appreciated that other ways of shaping the thick edge 5 of the slab can be devised as variants of those illustrated, by combining and/or varying features of the embodiments of the invention shown in FIGURES 16 and 18 to 21.

The special shaping of the thick edge of the slab as illustrated in FIGURES 16 to 21 can be incorporated with advantage in all the various embodiments of FIGures 2 to 15 discussed above.

It is to be understood that the invention comprises display apparatus as disclosed in FIGURES 16 to 21, modified in that the reflecting surface is not faceted and the illumination is continuous. It is also to be understood that the invention includes the embodiments disclosed in FIGURES 2 to 15, modified to have the reflecting surface without facets and the illumination continuous, whether or not the thick edge of the respective slabs are bevelled as proposed with reference to FIGURES 16 to 21.

I claim:
1. In display apparatus, the combination of:
 (a) a wedge comprising a light transparent material and having front and back major faces inclined with respect to each other with a thick edge and a thin edge opposite said thick edge extending between said faces, said faces being optically substantially smooth, said thick edge including at least one bevel on the side of said thick edge adjacent the back face;
 (b) a reflecting surface comprising a multiplicity of facets arranged in predetermined different orientations, said surface being located adjacent and generally parallel to said back face; and

(c) a source of illumination arranged to direct light through said thick edge including said bevel into said transparent material whereby said light is projected uniformly from substantially all of said back face onto said reflecting surface.

2. Apparatus as claimed in claim 1 wherein the maximum angle between the plane of said bevel and the plane of the remainder of said thick edge is 60°.

3. Apparatus as claimed in claim 1 wherein the angle formed between said front and back major faces is between 2° and 6°.

4. Apparatus as claimed in claim 1 wherein said bevel has a convex surface.

5. Apparatus as claimed in claim 1 wherein said thick edge comprises two bevels on the side of said thick edge adjacent the back face.

6. Apparatus as claimed in claim 1 wherein said back face is concave to improve light distribution to the reflecting surface.

7. Apparatus as claimed in claim 1 wherein said front face is provided with a coating layer of a transparent substance having a different critical angle from that of the material of the wedge to reduce light loss through said front face.

8. Apparatus as claimed in claim 1 wherein said thick edge is shaped in cross-section perpendicular to said front face so as to obtain substantially uniform illumination of substantially the whole area of said rear face.

9. Apparatus as claimed in claim 1 wherein the thick edge adjacent said front face is inclined with respect to the front face to form an obtuse angle therewith.

10. Apparatus as claimed in claim 9 wherein the portion of the thick edge adjacent said front face is convexly curved.

11. Apparatus as claimed in claim 9 wherein the portion of the thick edge adjacent said front face is concavely curved.

12. Apparatus as claimed in claim 11 wherein the source of illumination is positioned opposite said concave portion of the thick edge.

13. Apparatus as claimed in claim 1 wherein the source of illumination comprises a series of fixed lamps and switching means for illuminating said lamps in predetermined sequence.

14. Apparatus as claimed in claim 1 wherein the light transparent material comprises an acrylic plastic material.

15. Display apparatus comprising a plurality of apparatuses as claimed in claim 21, the individual wedges being contiguous and the reflecting surface extending continuously over the rear faces of said individual wedges.

16. Apparatus as claimed in claim 15 wherein said individual wedges are arranged with their thin edges contiguous.

17. Apparatus as claimed in claim 15 wherein said individual wedges form sectors of a polygon.

18. Apparatus as claimed in claim 1 wherein said thick edge comprises at least two straight parts inclined with respect to each other whereby light projected from said illuminating source will be directed generally towards the middle of said wedge to improve effective illumination of said reflecting surface.

19. In display apparatus, the combination:
(a) a circular member comprising a light transparent material and having front and back major faces of concave cone-shape such that the peripheral edge of said member is thicker than its center, said faces being optically substantially smooth, said peripheral edge including at least one bevel on the side of said peripheral edge adjacent the back face;
(b) a reflecting surface comprising a multiplicity of facets arranged in predetermined different orientation said surface being located adjacent and generally parallel to said back face; and
(c) a source of illumination arranged to direct light through said peripheral edge including said bevel into said light transparent material whereby said light is projected uniformly from substantially all of said back face onto said reflecting surface.

20. In display apparatus, the combination of:
(a) a wedge comprising a light transparent material having front and back major faces inclined with respect to each other with a thick edge and a thin edge opposite said thick edge extending between said faces, said faces being optically substantially smooth;
(b) a reflecting surface comprising a multiplicity of facets arranged in predetermined different orientations, said surface being located adjacent and generally parallel to said back face;
(c) a longitudinally extending cavity within said wedge adjacent said thick edge; and
(d) a source of illumination within said longitudinally extending cavity comprising an elongated light source extending lengthwise of said thick edge, a member carrying helical opaque and transparent portions which surrounds the elongated light source, and means for rotating said member.

21. In display apparatus, the combination of:
(a) a wedge comprising a light transparent material and having front and back major faces inclined with respect to each other with a thick edge and a thin edge opposite said thick edge extending between said faces, said faces being optically substantially smooth;
(b) a reflecting surface comprising a multiplicity of facets arranged in predetermined different orientations, said surface being located adjacent and generally parallel to said back face; and
(c) a source of illumination comprising an elongated light source extending lengthwise of said thick edge and arranged to direct light through said thick edge, an endless band having alternate opaque and transparent portions between said light source and thick edge, and means for continuously moving said endless band lengthwise.

22. In display apparatus, the combination of:
(a) a wedge comprising a light transparent material and having front and back major faces inclined with respect to each other with a thick edge and a thin edge opposite said thick edge extending between said faces, said faces being optically substantially smooth;
(b) a reflecting surface comprising a multiplicity of facets arranged in predetermined different orientations said surface being located adjacent and generally parallel to said back face and being divided into at least two portions covering different areas of said rear face, said portions being spaced at different distances from said rear face whereby a three-dimensional effect is produced; and
(c) a source of illumination arranged to direct light through said thick edge into said transparent material whereby said light is projected from said back face onto said reflecting surface.

References Cited

UNITED STATES PATENTS 2,560,392   7/1951   Latrobe _ _ _ _ _ _ _ _ _ _ _   40—106.52

EUGENE R. CAPOZIO, Primary Examiner

RICHARD CARTER, Assistant Examiner

U.S. Cl. X.R.

350—96, 152.2; 40—106.1